A. Brown,

Governor.

No. 2,753.

Reissued Aug. 27, 1867.

Witnesses;
Wm B Livingston
Wm E Sayre

Inventor;
A Brown
By Munn & Co
Attys

N. PETERS, PHOTO-LITHOGRAPHER, WASHINGTON, D. C.

United States Patent Office.

AUGUSTUS BROWN, OF NEW YORK, N. Y.

*Letters Patent No.* 50,793, *dated November* 7, 1865; *reissue No.* 2,753, *dated August* 27, 1867.

IMPROVEMENT IN GOVERNORS FOR STEAM ENGINES.

The Schedule referred to in these Letters Patent and making part of the same.

TO ALL WHOM IT MAY CONCERN:

Be it known that I, AUGUSTUS BROWN, of New York, 57 Lewis street, in the county and State of New York, have invented a new and improved Steam-Engine Governor; and I hereby declare that the following is a full, clear, and exact description thereof, which will enable those skilled in the art to make and use the same, reference being had to the accompanying drawing, forming part of this specification, in which drawing—

Similar letters indicate corresponding parts.

The object of this invention is to combine with the governor of a steam engine a stop-motion, which is so arranged that, when the belt of the governor breaks or parts from some cause, the throttle-valve will be closed, and the engine is prevented from running away and doing some injury.

This object is effected by the arrrangement of a swivel-arm in combination with the governor, and with a valve, which has a rotary, or a rising and falling motion, or both, and which is so arranged that it closes by either of these motions.

The valve is opened and closed either by the action of the governor-balls, in the ordinary manner, or by the motion of a swivel-arm, which is retained against the action of a spring or weight by the driving-belt of the governor, and which is free to follow the action of the spring or weight when the driving-belt breaks or parts.

Figure 1:
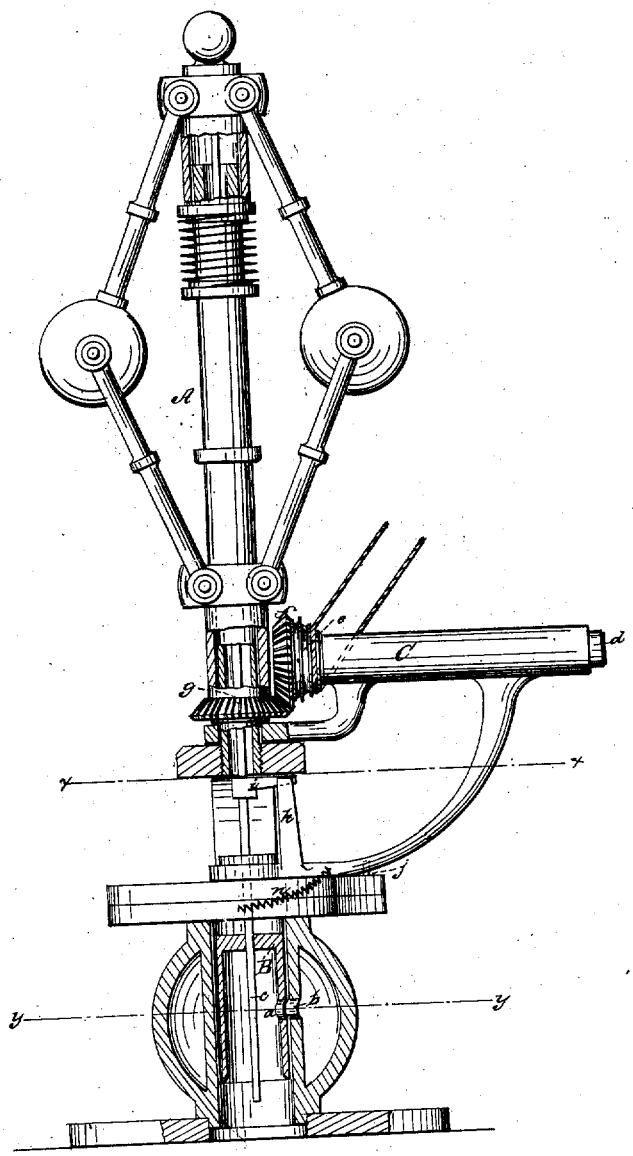
Figure 1 represents a sectional side elevation of this invention.
Figure 2:
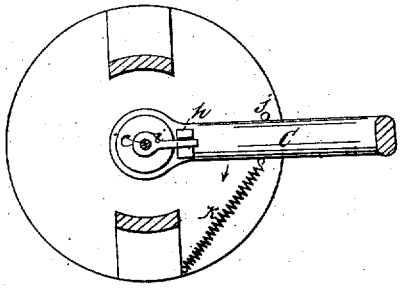
Figure 2 is a horizontal section of the same, taken in the plane indicated by the line *x x*, fig. 1.
Figure 3:
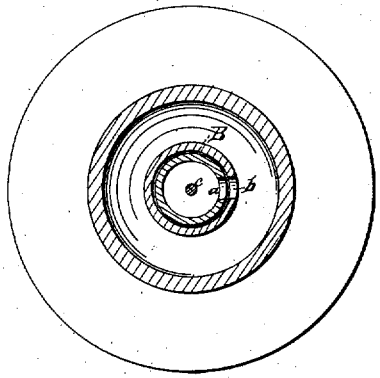
Figure 3 is a similar section of the same, the plane of section being indicated by the line *y y*, fig. 1.

A represents a ball-governor, which is constructed in any suitable manner, and which is connected to the valve B in such a manner that when the balls fly out the valve is closed, and when the balls sink down the valve is opened. Said valve is constructed by preference in the form of a cylinder, which fits into a cylindrical shell, so that a revolving motion can be imparted to it as well as a rising and falling motion; and the communication between the steam-supply pipe and the steam-cylinder is governed by the position of two or more holes *a b*, one in the valve, and the other in the shell. If these holes register, the steam passes freely to the cylinder; but if, by raising or lowering the valve, the hole *a* is brought in such a position that it is partially or wholly covered by the solid part of the shell, the supply of steam to the cylinder is diminished or entirely cut off. From the centre of the valve B rises a stem, *c*, which connects with the governor, so that, by the action of the same, the valve is raised or lowered, and thereby the supply of steam to the cylinder is regulated. Said stem forms the bearings for a swivel-arm or frame, C, which embraces the stem at two points, and which is provided with a long box or bearing for the driving-shaft *d* of the governor. On this shaft is mounted a pulley, *e*, and a bevel-wheel, *f*, which latter gears into a bevel-wheel, *g*, on the spindle of the governor; and a belt passing over the pulley *e* imparts to the shaft the desired rotary motion. From the swivel-arm C rises a forked standard, *h*, which straddles a lever, *i*, extending from the valve-stem *e*, so that, if the swivel-arm is turned in either direction, the valve-stem and the valve are compelled to turn with it. By the action of the belt, which imparts motion to the shaft *d*, the swivel-arm C is drawn up against a stop, *j*, as shown in fig. 2 of the drawing; and in this position the holes *a b* in the valve, and its shell-register, (provided the valve is not raised,) and the supply of steam to the cylinder is regulated by the action of the governor in the usual manner. A spring, *k*, acting on the arm C, has a tendency to turn the same with the valve in the direction of the arrow marked near it in fig. 2. As long as the belt draws said arm up against the stop the spring is held extended; but if the belt breaks or runs off from its pulley the spring causes the swivel-arm to turn, and the valve is closed.

It is obvious that the spring *k* might be replaced by a weight, and the swivel-arm might be connected to a valve which has only a rising and falling, or only a rotary motion. I do not wish to confine myself, therefore, o the precise construction of the valve; neither to the precise construction of the governor shown in the lrawing.

What I claim as new, and desire to secure by Letters Patent, is—

The swivel-arm C, subjected to the action of a spring or weight, in combination with the throttle or governor-valve of a steam engine, and with the belt which serves to impart motion to the governor, substantially as and for the purpose described.

AUGUSTUS BROWN.

Witnesses:

W. HAUFF,

GUSTAV BERG.